United States Patent [19]

Bourbin et al.

[11] Patent Number: 4,563,087

[45] Date of Patent: Jan. 7, 1986

[54] PROCESS AND DEVICE FOR SIMULTANEOUSLY MEASURING THE GEOMETRICAL CHARACTERISTICS OF AN OPTICAL FIBRE

[75] Inventors: Yannic Bourbin; Hervé Arditty, both of Paris, France

[73] Assignee: Thomson-CSF, Paris, France

[21] Appl. No.: 494,253

[22] Filed: May 13, 1983

[30] Foreign Application Priority Data

May 14, 1982 [FR] France .............................. 82 08479

[51] Int. Cl.[4] .............................................. G01B 11/12
[52] U.S. Cl. .................................................. 356/73.1
[58] Field of Search ...................... 356/73.1, 376, 121

[56] References Cited

U.S. PATENT DOCUMENTS 4,299,491 11/1981 Waters et al. ...................... 356/376

FOREIGN PATENT DOCUMENTS 2437637 1/1968 France .
151948 4/1980 France .

Primary Examiner—Vincent P. McGraw
Assistant Examiner—S. A. Turner
Attorney, Agent, or Firm—Oblon, Fisher, Spivak, McClelland & Maier

[57] ABSTRACT

The invention relates to a process and device for measuring the optical core - mechanical sheath concentricity and the optical core ellipticity of an optical fibre. The process consists of injecting a light beam into a fibre, which has been previously bared at one of its ends. The analysis of the near field of this fibre by a detector performing a relative rotary movement with respect to said fibre provides details on the core - sheath concentricity and the core ellipticity, by carrying out a narrow band detection at the rotational frequency and at double its frequency.

8 Claims, 15 Drawing Figures

FIG.1
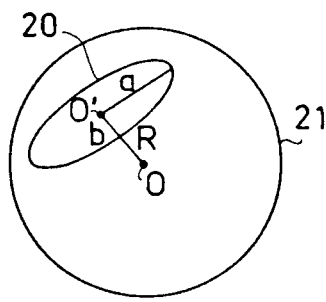
FIG.2
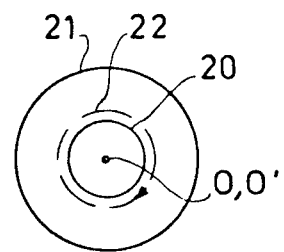
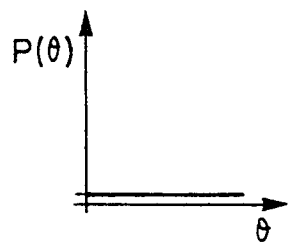
FIG.3
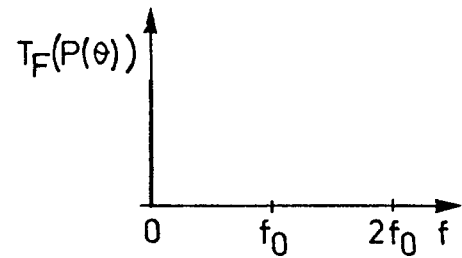
FIG.4
FIG.5
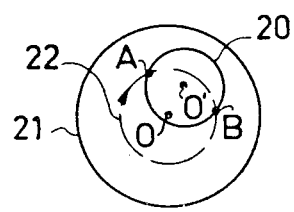
FIG.6
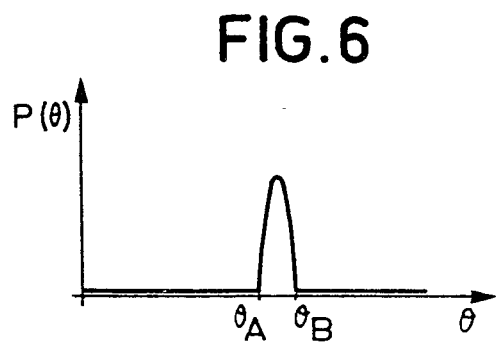
FIG.7
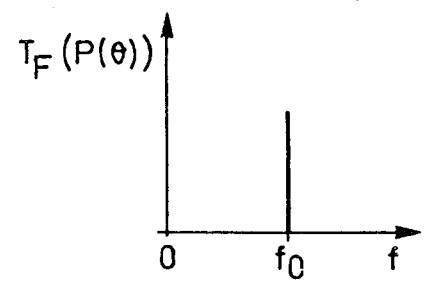

PROCESS AND DEVICE FOR SIMULTANEOUSLY MEASURING THE GEOMETRICAL CHARACTERISTICS OF AN OPTICAL FIBRE

BACKGROUND OF THE INVENTION

The present invention relates to a process for the simultaneous measurement of the geometrical characteristics of an optical fibre and in particular the optical core - mechanical sheath concentricity and the ellipticity of the optical core of an optical fibre, as well as to a device for performing this process.

As is known, an optical fibre comprises a core and an optical sheath. The core and sheath essentially differ by their optical - refractive index. The evolution of this optical refractive index takes place in accordance with a predetermined profile. After drawing, the optical fibre usually comprises its two regions, a support tube and an external protective sheath placed around the latter during a subsequent manufacturing stage.

There are two types of fibre. Firstly, multimode fibres, which generally have an index gradient for which the core diameter is typically 50 micrometers and the external optical sheath diameter 70 micrometers. Monomode fibres, generally have an index jump, for which the core diameter is between 5 and 10 micrometers, whilst the external diameter of the optical sheath is approximately 40 micrometers. The external diameter of the support tube, which is usually made from pure silica, is approximately 125 micrometers and the external diameter of the protective sheath, e.g. of silicone, is approximately 300 micrometers.

The appearance of optical fibres made from silica/doped silica have made it possible to significantly reduce the optical transmission losses of optical fibres. It is at present possible to produce fibres having losses below 0.5 dB/km. The fibres must be very homogeneous to obtain such performance levels. In particular, to obtain a coupling between two fibres having low losses, it is necessary for the geometrical characteristics of these two fibres to be very close together. It is therefore necessary to check these characteristics very accurately and in particular the core-sheath concentricity and the core ellipticity. It is also necessary to carry out an adequate number of measurements to ensure the homogeneity of these geometrical characteristics along the fibre.

It is known to carry out these measurements by using a microscope having a reticule consisting of two concentric circles corresponding to the optical core and the mechanical sheath of an ideal optical fibre, i.e. with the optical core and mechanical sheath perfectly cylindrical and concentric with respect to one another, the core of said optical fibre being illuminated by a beam of white light. In this case, the protective envelope has been removed before the measurement. However, this measurement only makes it possible to carry out a classification or sorting with respect to limiting ellipticity and eccentricity values and gives no order of magnitude for these. Thus, this process is purely manual and does not make it possible to carry out precise measurements of the characteristics to be measured and only enables a sorting to be made.

SUMMARY OF THE INVENTION

However, the present invention provides a process and a device for performing this process only requiring very simple equipment and permitting the precise measurement of the aforementioned parameters in an automatic manner. Moreover, it is no longer necessary to determine the geometrical dimensions of the fibre before performing the measurement of these parameters, which was not the case with the prior art processes.

The present invention therefore specifically relates to a process for measuring the geometrical characteristics of an optical fibre comprising at least one optical core, a mechanical sheath and a protective sheath, said measurement consisting at least of the measurement of the concentricity of the optical core and the mechanical sheath, as well as the measurement of the core ellipticity, wherein it comprises:

a first stage of preparing the fibre to be measured, which consists of baring the mechanical sheath by a length of said fibre at one end thereof and then sawing and polishing the face of said first end of the fibre;

a second stage of positioning an incoherent light source producing a light beam facing the second end of the fibre in order to pass said beam into the said fibre;

a third stage of analyzing the near field of this fibre at its first end and consisting of forming in a plane a magnified image of the outlet face of said first fibre end, a photodetector being placed in this plane, a relative rotation with respect to the centre of the mechanical sheath of the fibre being carried out between the image and the photodetector, said rotation being peformed at a frequency $f_o$;

a fourth stage of processing the signal received by the photodetector comprising:

a phase of calibrating the measurement by comparing with reference signals;

a phase of detecting the amplitude of the signal received by the photodetector at frequencies which are multiples of the rotation frequency $f_o$;

a phase of determining the concentricity of the optical core and mechanical sheath and the ellipticity of the optical core of the fibre on the basis of amplitudes measured at frequencies $f_o$ and $2f_o$.

The invention also relates to a device for performing this process.

DESCRIPTION OF THE DRAWINGS

The invention is described in greater detail hereinafter relative to non-limitative embodiments and the attached drawings, wherein show:

FIG. 1 the parameters to be measured.

FIGS. 2 to 13 different configurations of the optical fibres, as well as the corresponding signals given by the process.

DETAILED DESCRIPTION OF THE INVENTION

Figure 8:
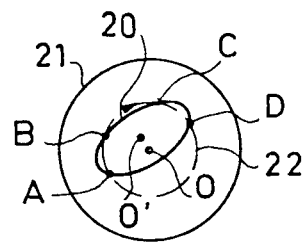

The parameters to be measured on an optical fibre are of very different physical natures and it is therefore of interest to carry out certain grouping with regards to the characterization as a function of the physical parameter used. The following classification is used:

Geometrical characteristics: these cover all the measurements related to dimensions of the core, the sheath and certain fibre coverings.

Optical characteristics: these relate to all the optical measurements which can be carried out in a cross-sectional plane of the fibre (e.g. numerical aperture, index profile, etc).

Transmission characteristics: these relate to all the measurements concerned with the light propagation in the fibre, no matter whether they apply to the carrier (attenuation) or to the modulation (base band response). They also cover the measurements of length and the continuity of the optical guide.

Mechanical characteristics: these relate to a group of tests (tension, traction, vibration, etc), which the fibre has to undergo, in order to ensure a good mechanical strength, directly linked with its service life.

In the case of the geometrical characteristics of the fibre, two approaches can be made for measuring these parameters, which are so important in connection problems.

The first, which can be termed analytical, consists of independently measuring the geometrical parameters of a fibre cross-section. Thus, the core diameter and its non-circularity, the sheath diameter and its non-circularity, the diameter of the first plastic covering and its non-circularity, the non-concentricity of the core and the sheath, and the non-concentricity of the core and the primary covering are measured. As the nominal values and tolerances for each of these parameters are known, it is possible to establish parameter by parameter whether the fibre is satisfactory.

The second approach, which is termed synthetic, consists of defining a model of concentric circles, on the basis of nominal values and tolerances of the core and sheath, and checking whether the image given by a fibre cross-section falls within said model.

No matter what the procedure used, it is necessary to obtain a magnified image of a fibre cross-section. This is obtained by using an optical arrangement, similar to that used in a microscope, which displays the near field of an illuminated object. The light source, which illuminates the fibre, must be highly divergent in order to also excite all the modes of the fibre and need not necessarily be monochromatic (e.g. arc lamp). The sample length is generally limited and the ends are carefully prepared.

The process according to the invention relates to this first analytical approach.

Thus, the process permits the simultaneous quantitative measurement of two parameters of great importance for the connection of two optical fibres, namely the optical core - mechanical sheath concentricity and the ellipticity of the optical core of these fibres, this taking place in a simple manner. The process also makes it possible to find the symmetry of higher orders (3, 4, etc) of the core by using the same basic principle.

FIG. 1 represents a magnified image of a fibre cross-section and the mechanical sheath 21 has a centre of symmetry O and the optical core 20 a centre of symmetry O', the concentricity is of value O, O' and the ellipticity $\epsilon$ is given by the formula $\epsilon^2 = a^2 - b^2$: a being the semi-major axis of the ellipse representing the core and b the semiminor axis of the same ellipse.

The process according to the invention has the advantage, compared with prior art processes, of not requiring the determination of the geometrical dimensions of the fibre in order to obtain the core - sheath eccentricity or off-centering deficiencies and the symmetries of order 2 (ellipticity) and of higher orders of the core. In addition, the process makes it possible to eliminate the measuring errors on the part of the operator, which are largely subjective in the known processes, through the use of stable electronics for measuring an optical signal from the fibre to be characterized.

A device realising the process of the invention will be described hereinafter with reference to FIG. 15.

The process of the invention is as follows. Incoherent light is passed into a short length of optical fibre (1 to 10 meters) and is recovered at the other end of the fibre, which has been carefully prepared by removing the external protection, sawing and then polishing. The near field of the fibre to be measured is then magnified by means of an optical device and is analyzed by means of a quasi-point photodiode, which performs a rotary movement around the centre of the circle, assumed to be perfect, which defines the exterior of the mechanical sheath of the fibre. The detection of the signal read by the photodiode in narrow band around multiple frequencies of the rotation frequency $f_o$ of the photodiode gives the sought information. The amplitude at $f_o$ is linked with core - sheath concentricity, that at $2f_o$ with the ellipticity of the core, that at $3f_o$ with its symmetry of order 3, etc. In the case of a parabolic index profile, the calculation makes it possible to show that the amplitude at $f_o$ is proportional to the core - sheath concentricity, that that at $2f_o$ is proportional to the square of the ellipticity of the core, etc. A prior calibration of the device e.g. makes it possible to determine the proportionality constants at different frequencies.

Different configurations of a fibre cross-section are to be considered with respect to the measuring signal giving the luminous power received by the photodiode as a function of time $\theta$, and the Fourier transform of this signal making it possible to reveal the lines of frequency $f_o$, $2f_o$ and $3f_o$.

In FIG. 2, O is the centre of the mechanical sheath 21 of the fibre, which is in this case considered to be a perfect cylinder and O' is the centre of circle 20, which represents the fibre core.

Thus, in accordance with circle 22, a detector is rotated around O or, which amounts to the same thing, the fibre is rotated. Thus, the relative rotation is represented by circle 20, when considering a fixed detector. It is therefore merely necessary to say that there is a relative rotation between the detector and the magnified image of the near field of the face of the fibre in a plane P, which is the plane in which the different configurations of the fibre are located and which will be examined hereinafter.

If the fibre is perfect, as shown in FIG. 2, O then coincides with O' and circle 22, which describes the relative movement of the detector with respect to the fibre, will not intersect the ellipse representing the core, whose major axis will be equal to the minor axis, i.e. the circle is consequently concentric to the sheath circle 21. Thus, the luminous power will be a constant, as illustrated in FIG. 3.

The Fourier transform of this signal is represented in FIG. 4 and only has one line at frequency O.

If the core is represented by a circle, but the latter is off-centered, as in FIG. 5, O and O' no longer coincide. Thus, in FIG. 6, it is possible to see the curve representing the luminous power 2, as a function of the time $\theta$ of the relative rotation of the detector with respect to the fibre. Thus, it is possible to see a line at rotation frequency $f_o$, which appears in FIG. 7, which is the Fourier transform of the signal received by the detector.

Figure 9:
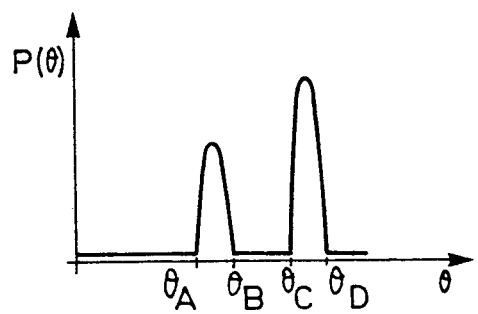
Figure 10:
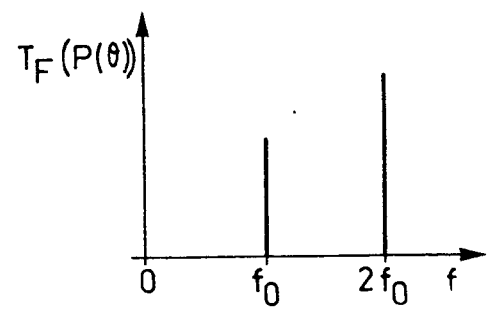

If the fibre core is represented by an ellipse 20 as in FIG. 8, the curve shown in FIG. 9 for the luminous power as a function of the time $\theta$ has two lines, with a component at rotation frequency $f_o$ and a component at double the frequency $2f_o$. Thus, if O and O' coincide, the amplitude of these two lines is then identical. The Fourier transform of this signal is shown in FIG. 10.

If the circle 22 of the relative rotation of the detector does not intersect this ellipse, the core is effectively excessively off-centered, so that this fibre must be eliminated.

Figure 11:
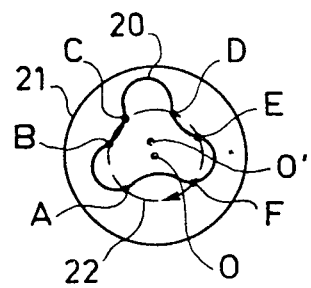
Figure 12:
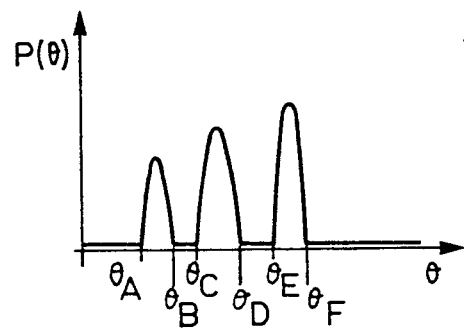
Figure 13:
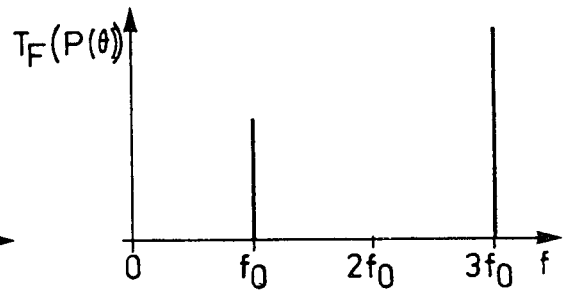

If the curve representing the core has a more tortuous shape, the ellipticity can then be of the third order and the power curve as a function of time $\theta$ then has three lines, as shown in FIGS. 11, 12 and 13. In FIG. 11, consideration is given to an image of the core having a symmetrical shape with respect to three segments from centre O' and which form angles of 120° with respect to one another, whilst in FIG. 13, representing the transform of the signal received, there are only two lines, one at $f_o$ and the other at $3f_o$. However, the amplitude of these different lines at $f_o$, $2f_o$ and $3f_o$ will make it possible to calculate the short geometrical characteristics of the fibre.

In the case of a good fibre, i.e. when the core is not excessively off-centered, the power received by the detector does not influence the number of lines and instead only influences their amplitude.

Thus, when a point describes a circle of radius $\theta$, centered on O at a velocity $d\theta/dt = \omega_o$, it is found that the Fourier development of the power received by this point is in the form:

$$P(\theta) = I_o + I_1 e^{-i\theta} + I_2 e^{-2i\theta} + R(\theta) 3^{-3i\theta}$$

Figure 14:
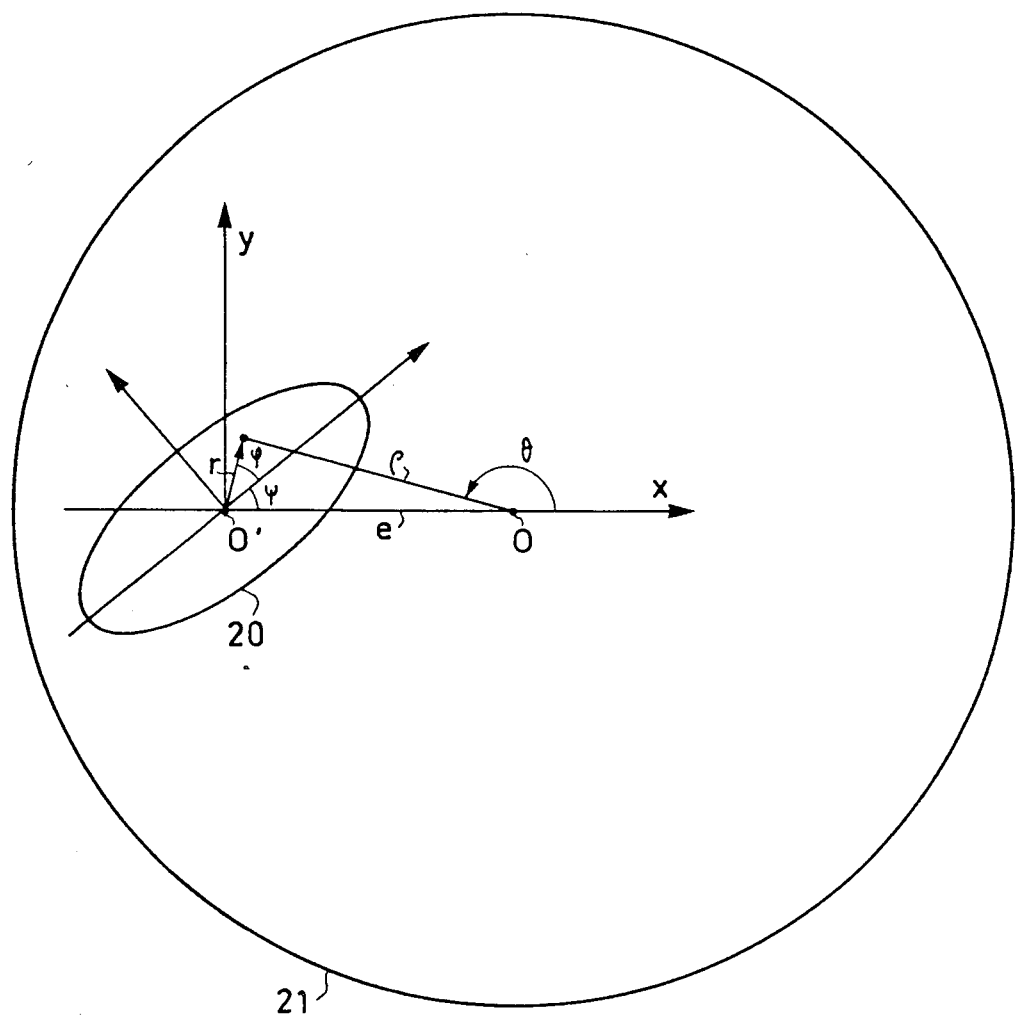
FIG. 14 the parameters to be measured.

In FIG. 14, O is the centre of the magnified image of the face of the fibre and O' the centre of symmetry of the optical core thereof. O, O' is the off-centering between the core and the fibre sheath: OO'=e and $\epsilon$ is the ellipticity of the fibre core, such that $\epsilon^2 = a^2 - b^2$.

In the case of an elliptical core with a parabolic refractive index distribution and a core off-centered with respect to the sheath, the refractive index of the core in the axes of the ellipse is given by:

$$n^2(r,\phi) = n^2(o)\left[1 - 2\Delta\frac{r^2}{a^2}\left(1 + \left(\frac{\epsilon^2}{b}\right)\sin^2\phi\right)\right]$$

$\Delta$ being the total index variation.

A good approximation consists of stating that the luminous power at any point of the near field is proportional to the square of the index at this point, assuming $P(r, \phi) = kn^2(r, \phi)$.

On taking at the centre of rotation in a fixed reference in which the photodetector occupies a fixed position $$\begin{cases} r^2 = \rho^2 + e^2 - 2e\rho\cos(\tau-\theta) = \rho^2 + e^2 + 2e\rho\cos\theta \\ \rho^2 = \phantom{r^2 + e^2} = r^2 + e^2 - 2er\cos(\rho+\psi) \\ e^2 = \phantom{r^2 + e^2} = r^2 + \rho^2 - 2\rho r\cos(\theta-(\rho+\psi)) \end{cases}$$

from which it is possible to deduce after calculations:

$$\sin^2 p = \sin^2 \psi + \rho \sin \theta \frac{\rho \sin(\theta - 2\psi) - e \sin 2\psi}{(e + \rho \cos \theta)^2 + \rho^2 \sin^2 \theta}$$

and therefore

-continued $$P(r,\phi) = P(\theta) = n^2(o)\left(1 - 2\Delta\frac{\rho^2 + e^2 + 2e\rho\cos\theta}{a^2}\left[1 + \left(\frac{\epsilon}{b}\right)^2\right.\right.$$

$$\left.\left.(\sin^2\psi + \rho\sin\theta\left(\frac{\rho\sin(\theta-2\psi) - e\sin 2\psi}{(e+\rho\cos\theta)^2 + \rho^2\sin^2\theta}\right)\right]\right)$$

the relations $r \simeq p$ and $e < < p$ can be taken into account. Taking account of these two relations, and performing the resulting approximations, it is possible to calculate the factor terms of $\cos \theta$, $\sin \theta$, $\sin 2\theta$.

As $P(\theta) = I_o + I_1 e^{-i\theta} + I_2 e^{-2i\theta} + R(\theta) e^{-3i\theta}$ there is a line of amplitude $$I_1 = 4\Delta \frac{e\rho}{a^2} n^2(o),$$

which makes it possible to obtain the eccentricity e at $2\theta$ there being an amplitude line $$I_2 = \Delta n^2(o)\frac{\rho^2}{a^2}\left(\frac{\epsilon}{b}\right)^2$$

which makes it possible to obtain the ellipticity to the square, i.e. $\epsilon^2$.

Thus, the line obtained by the Fourier transform of the signal received by the detector at rotation frequency $f_o$ is proportional to e and the line at a frequency double the rotation frequency is proportional to $\epsilon^2$.

The fibre, used in exemplified manner in the aforementioned calculations, is a highly multimode fibre for which the indexed profile on approaching the core, is roughly parabolic, i.e. the luminous power is given by the relation $P = kn^2$.

In a monomode fibre, this profile is a Gaussian signal.

Thus, in the calculations, the considered fibre was a highly multimode fibre and, in order to simplify the calculations, a parabolic power was used as a function of the radius. In the case of a monomode fibre, it is necessary to recommence the calculations with a Gaussian power as a function of the radius, but the same results are obtained.

Figure 15:
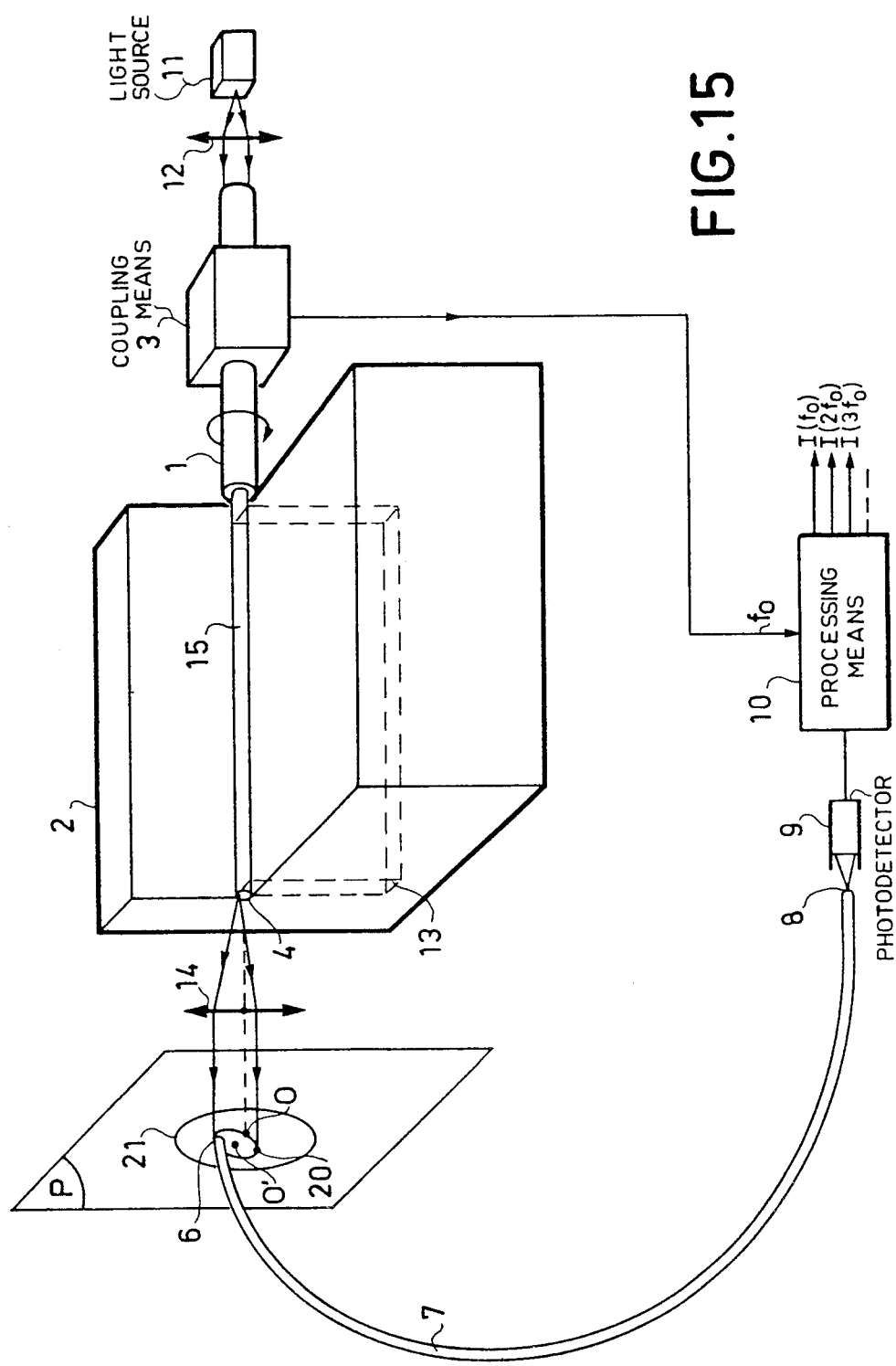
FIG. 15 the device for performing the process of the invention.

FIG. 15 illustrates the device for performing the process according to the invention.

The fibre 1 to be measured is, for example, bared and one of its ends is prepared (sawing and polishing, or very clean break). The length of the thus bared fibre 15 is held in a high precision vacuum mandrel 2 and a device 3 imparts a rotational movement to fibre 1, in such a way that the latter can bear on the trued surfaces of the mandrel forming a dihedron. The prepared face 4 of fibre 1 arrives at the edge of the dihedron. A magnified image of the near field of the fibre is formed in a plane P. The excellent straightness of the dihedron walls, as well as the very good circularity of the silica tube surrounding the fibre makes it possible to accurately know the centre of the image of the mechanical sheath of fibre 1 in plane P. The end 6 of a monomode fibre 7 is placed in plane P, in such a way as to encounter there the image 20 of the core of fibre 1. The other end 8 of this fibre is placed in front of a photodetector 9, coupled to processing electronic means 10 for considering the received signal at frequencies equal to double, triple, etc of a given frequency $f_o$. Light is injected into fibre 1 by means of a source 11 and a coupling optics 12. Device 3 leads to fibre 1 performing a rotational movement of frequency $f_o$. After calibrating the manipulation by comparison with reference signals, the reading at the different frequencies $f_o$, $2f_o$, $3f_o$, etc of the signals supplied by means 10 gives the sought information: core - sheath concentricity, core ellipticity, etc.

In the optical fibre vacuum mandrel 2, the fibre position is marked with respect to the trued and polished faces by a V-shaped groove and is firmly held by the vacuum produced via a slot 13, which has been especially designed at optimized for the considered fibre diameter.

In FIG. 15, fibre 1 has a limited length so that e.g. there is no need to wind it onto a drum. However, it can also have a length between e.g. 1 and 10 meters, when it is wound onto a drum and the assembly formed by source 11 and objective 12 is rotated at the considered frequency $f_o$. Onto the drum is wound that part of the fibre which is not bared and which is therefore located between mandrel 2 and source 11.

Thus, in FIG. 15, the light beam emitted by light source 11, which is e.g. an incoherent light source, is collimated by objective 12 to reach the core of optical fibre 1. The mechanical sheath of optical fibre 1 has been bared at end 4 of fibre 1. This part is positioned in the high precision vacuum mandrel, whose slot 13 ensures the contact between the required fibre length 15 and mandrel 2 as a result of vacuum action. Device 3 makes it possible to rotate fibre 3 at rotation frequency $\omega_o = 2\pi f_o$. For example, device 3 can be constituted by rotary rollers, which jam the fibre when rotating it.

The light beam emanating from the outlet face 4 of the fibre is projected via objective 14 into plane P, where it recognises the circle of centre O representing the mechanical sheath of the fibre and the ellipse of centre O' corresponding to the fibre core.

The end of fibre 7, considered as an example, is used as a point detector 6, which describes a circle relative to the ellipse representing the core of fibre 1. Fibre 7 makes it possible to form the connection with a detector 9, which is itself connected to processing means 10, which comprises a detector synchronous of the rotation frequency $f_o$. It is also possible to consider a fixed fibre 1 and in this case the point detector 6 is rotated.

The different alignments obtained between the source and the fibre via the objective between the fibre end and the detector, as well as the positioning of the other end of fibre 1 in plane P form part of the prior art. There is no need for the precise alignment of the fibre relative to the vacuum mandrel.

When the fibre is a multimode fibre, the modes transmitted in the sheath are removed, e.g. by immersing part of the bared fibre in an index liquid, which makes it possible to have higher measuring dynamics.

The length of the fibre considered is less than 10 meters and for this length the modal equilibrium law is realised for a multimode fibre and for a monomode fibre wound onto a drum the sheath modes are removed and for greater lengths propagation losses then occur.

The main application of the invention is in the characterization of optical fibres, as well as in optical fibre connectics relative to the automatic centering of the fibre core in a connector end fitting.

What is claimed is:

1. A process for measuring the geometrical characteristics of an optical fibre having at least one optical core, a mechanical sheath and a protective sheath wherein said measurement includes the measurement of at least the concentricity of said optical core and said mechanical sheath, as well as the measurement of the core ellipticity, said process comprising the steps of:
   preparing said fibre to be measured including the steps of baring said mechanical sheath by a length of said fibre at one end of said fibre and sawing and polishing the face of said one end of said fibre;
   positioning an incoherent light source producing a light beam wherein said light source faces the other end of said fibre and wherein said beam is passed into said fibre at said other end;
   analysing the near field of said fibre at said one end involving the steps of forming in a plane a magnified image of the outlet face of said one fibre end by placing a photodetector in said plane and including the step of carrying out a relative rotation with respect to the center of said sheath between said image and said photodetector with said rotation being performed at a first frequency $f_o$;
   processing the signal received by said photodetector including the steps of calibrating the measurement by comparison with reference signals, detecting and measuring the amplitude of the signal received by said photodetector at frequencies which are multiples of said first frequency $f_o$, and determining the concentricity of said optical core and said sheath and the ellipticity of said optical core of said fibre on the basis of said measured amplitudes at said first frequency $f_o$ and at a second frequency $2f_o$, respectively.

2. A measuring process according to claim 1, wherein processing the signal also comprises the determination of the symmetry of order 3 of the optical core on the basis of the amplitude of the signal at frequency $3f_o$.

3. A device for measuring the geometrical characteristics of an optical fibre having at least one optical core, a mechanical sheath and a protective sheath, said device comprising;
   an incoherent light source emitting a light beam;
   an objective for collimating said light beam positioned so that said optical fibre receives said light beam at a first end of said fibre;
   a vacuum mandrel having rectilinear surfaces forming a dihedron wherein said mandrel maintains a second end of said fibre with an outlet face of said fibre reaching the edge of said dihedron:
   rotational means for rotating said second end of said fibre;
   a second objective which collimates the beam leaving said second end of said fibre;
   detection means in a detection plane perpendicular to the direction of the axis of symmetry of said second end of said fibre; and
   electronic processing means coupled to said detection means for analysing the signal received by said photodetector means at frequencies which are multiples of the frequency of said rotational means.

4. A device according to claim 3, wherein the means for rotating the fibre are positioned between the source and the vacuum mandrel.

5. A device according to claim 3, wherein the fibre to be measured has a length between 1 and 10 meters.

6. A device according to claim 3, wherein the detection means are realised by a photodetector.

7. A measuring device according to claim 3, wherein the photodetector means comprise a photodetector coupled to one end of a monomode fibre, the other end of the latter being placed in the detection plane.

8. A device according to claim 3, wherein the electronic processing means comprise a synchronous amplifier of the rotational frequency $f_o$.

* * * * *